# 2,744,024

ALKALI CONVERSION OF BARK

Eduard Farber, Washington, D. C., assignor, by mesne assignments, to Union Lumber Company, San Francisco, Calif., a corporation of California No Drawing. Application November 22, 1954,
Serial No. 470,524

8 Claims. (Cl. 106—163)

This invention relates to a process for the alkali conversion of bark to a generally water-soluble, thermoplastic, non-fibrous material. More particularly, the invention relates to a method for reacting particulate bark and a particulate basic substance, in the dry state, to produce a water-soluble product useful as an emulsifying and dispersing agent, protein precipitant, and the like.

The primary constituents of bark embrace lignin, cellulose, hemicelluloses, and various extractive materials. Certain of the extractable materials, such as tannins, have been found to be useful in the tanning arts, but are obtained in relatively small yields, and primarily in dilute solution. Furthermore, recovery and use of only the extractable substances present in bark results in waste of the major portion of the bark substance.

Prior art efforts to convert whole bark to a product having industrial utility embraced the digestive process in which the bark treating chemicals are contained in an aqueous or liquid medium. Previous workers have taught the use of liquid media and particularly aqueous solutions of reagents as an essential prerequisite to the commercially feasible chemical modification of bark. Aqueous media were generally considered necessary to achieve adequate contact between the chemicals and the bark particles. The chemical reactants employed in such prior art processes, for example, a basic material, are to a large extent neutralized or dissipated while in aqueous solution by the soluble materials which are extracted from the bark and are, therefore, not effective as such to chemically convert non-extractable forms of bark to useful materials, even if the reaction mixture is heated after the water has been evaporated. Accordingly, the products obtained by such processes have resembled, to some extent, the bark starting material and are generally fibrous in character or contain a substantial portion of fibrous materials. Processes which entail the use of aqueous basic solutions in bark digestion operations have also proved economically undesirable, in necessitating the evaporation of excessive amounts of water.

Now, in accordance with this invention, it has been discovered that particulate, substantially dry bark can be reacted with dry alkali metal hydroxides in the absence of added water to produce a water-soluble thermoplastic material of marked utility, inter alia, as an emulsifying, dispersing and viscosity reducing agent, as a protein precipitant, and as a tanning agent. It is unexpected in view of the prior art that bark can be so chemically converted in the dry state to a thermoplastic material. Significantly, only minor amounts of lower molecular weight products including organic acids are formed in the process of this invention.

In the practice of this invention, particulate bark is intimately mixed with particulate alkali metal hydroxide in the dry state and the mixture so formed is agitated and heated at a temperature of from about 100° C. to about 150° C. until the bark particles begin to coalesce to produce a dry, water-soluble reaction product. It is important to the invention that the alkali metal hydroxide be used in an amount sufficient to provide from about one to about ten parts thereof by weight for each ten parts by weight of bark.

Conventional apparatus, such as a hammermill, can be used to comminute bark for use in the invention. Generally, the bark is reduced to a particle size distribution of between about 0.01 and 0.25 inch. The bark which is employed in the process of this invention is in substantially dry form, i. e., the bark contains no more than about the equilibrium moisture content which it acquires under normal atmospheric conditions. Bark having a moisture content in excess of about 20% is not desirable for use in the invention. Preferably the bark employed in the invention is characterized by a moisture content of not more than about 10% by weight. The bark may appropriately be dried by exposure to the air or by any of the conventional kiln-drying methods. The bark can appropriately be mixed with the alkali metal hydroxide while still hot from the dehydration process. Mechanical disintegration of the bark can precede or follow the drying. In some cases, it is advantageous to carry out a part of the mechanical disintegration of the bark prior to the drying step, thereafter reduce the moisture content to the desired figure and subsequently comminute the bark to the appropriate particle size.

Bark of any botanical kind is suitable for use in the invention. For example, hickory, oak, beech, redwood, poplar, and all other barks can be employed.

The alkali metal hydroxide used can be any alkali metal hydroxide or mixtures of alkali metal hydroxides including specifically sodium, potassium, and lithium hydroxides, and mixtures thereof. The alkali metal hydroxide is employed in an amount sufficient to provide from about 1 to about 10 parts by weight thereof for each ten parts by weight of bark employed. Preferably, the alkali metal hydroxide is used in an amount suitable to provide from about 2 to about 5 parts by weight thereof for each 10 parts by weight of bark.

In the preferred embodiment of the invention, the reduction of the bark to the final desired particle size range and the mixing with the alkali metal hydroxide is effected simultaneously in the same piece of equipment. For example, an intimate mixture of bark having a particle size substantially larger than that ultimately desired and alkali metal hydroxide is produced by introducing these components in the desired proportions into a shredder or mixer of conventional design, either batchwise or continuously. During this intimate mixing and disintegration process, the temperature of the mixture will rise somewhat as a result both of friction and incipient heat of reaction. The intimate, substantially dry mixture formed in the combined mixing and shredding operation will continue to react spontaneously if protected from heat loss. However, such a spontaneous reaction is relatively slow and cannot be controlled with ease. It is, therefore, preferred to apply external heat to the reaction mixture. Indirect heating through the mechanism of a heating fluid passed adjacent the surfaces of the shredder-mixer apparatus can be employed. The invention is completed at a temperature of from about 100° C. to about 150° C., preferably at a temperature of between 120° C. to about 140° C. The reaction is continued under such conditions until the bark particles begin to coalesce, indicating conversion of the bark to a generally thermoplastic material which is water-soluble. Generally, a reaction time of about 5 to 30 minutes subsequent to the application of heat, i. e., at a temperature in excess of 100° C., is adequate.

After reaction has been completed to the plastic state, the original fibrous structure of the bark materials is no longer recognizable and the material is relatively stable. After cooling, the product obtained is brittle and can be ground into a fine powder which is essentially non-caking under the usual conditions of storage. A lump of the product obtained prior to grinding shows a uniform, glossy fracture, indicating the complete nature of the change of the product from the original fibrous structure of the bark.

The product is substantially completely water-soluble. The aqueous solutions of the product are alkaline and of deep reddish brown color. Such solutions are stable upon neutralization and under slight degrees of acidity correspond to a pH of between about 4 and 5. Acidification to a lower pH by means of strong mineral acids effects precipitation of an organic product in the form of a dark brown powder. Only small quantities of low molecular organic acids, such as acetic acid and oxalic acid, are formed in the process. Specifically, only about 5 to 10 parts by weight of such acids are present in each 100 parts by weight of the product.

The apparatus in which the process of this invention is carried out preferably is one designed to provide large surface areas of contact between the material and the surfaces through which heat is applied to the reaction mixture. One preferred form of apparatus comprises a mixer having a jacketed bowl and mixing blades which may appropriately be of sigma shape. Such an apparatus is best suited for batchwise operations. A heated trough with an internally heated screw can be employed for continuous operations.

For the purposes of obtaining a final product which does not present a dusting problem, minor proportions of hydroxy compounds, such as glycerine or polyethylene glycol, i. e., a polyethylene glycol having a molecular weight of from about 62 to about 400 can be added to the reaction mixture toward the end of the reaction. Impure by-products containing polyhydroxy compounds can be similarly employed. Examples of such impure by-products include those by-products obtained in the hydrogenating of sugars, cellulose, and other wood products.

The practice of this invention will be further appreciated from a consideration of the following examples.

*Example I*

1.3 pounds of flake sodium hydroxide and 4 pounds of redwood bark, ground in a hammermill to a particle size range of about 0.01 to about 0.25 inch and containing about 3.7 pounds of dry substance, were simultaneously charged into the inner bowl of a Baker-Perkins double sigma-blade mixer. The inner bowl of the mixer was used both as a mixer and reactor. This bowl was 11¾" x 13½" in lateral dimensions and was 17" deep, and was provided with a jacket for a heating medium and a conical cover for use as an exhaust for vapors.

Mixing of the sodium hydroxide and bark was continued in the inner bowl of the mixer for about 30 minutes and thereafter a heating medium, i. e., steam, was passed through the jacket of the bowl under a pressure of about 80 lbs. p. s. i. for a period of about 2 hours under conditions requisite to maintain the reaction mixture at a temperature of from 120° C. to about 140° C. The product obtained was in the form of a plastic material substantially completely soluble in water, finding great utility as an emulsifying agent and a dispersant. The product was also useful in leather tanning, and as a protein precipitant.

Specifically, an aqueous solution containing about 8% by weight of the product was obtained and the pH was lowered by the addition of acetic acid to about 6.5. This solution is useful as a tanning agent.

A second aqueous solution of the product of this example was prepared. This solution contained about 5% by weight of such product. The pH of this solution was lowered to about 4 by the addition of lactic acid. The solution so obtained was useful to effect the precipitation of gluten from a gluten-containing wash liquor obtained in the separation of starch from gluten. The solution of the product of this invention is effective to precipitate proteins generally from aqueous solutions. The product of this invention also is effective in lowering the viscosity and shear or yield points of thixotropic muds.

*Example II*

The process of Example I was repeated with the exception that potassium hydroxide was used in lieu of sodium hydroxide. Likewise, in this example the reaction was carried out only for a period of about 30 minutes after the application of heat. The product was similar to that obtained in Example I.

*Example III*

The process of Example I was repeated with the exception that 5 lbs. of bark and 2.5 lbs. of sodium hydroxide were employed. The reaction in this case was more rapid but a similar product was obtained.

*Example IV*

The process of Example I was repeated with the exception that in this instance 5% of crude ethylene glycol were added after the reaction had reached a temperature of about 122° C. The product so obtained was non-dusting and was 95% soluble in water.

*Example V*

Redwood bark containing more than about 20% by weight of moisture was reduced to chips and the chips were dried until the moisture content thereof was not more than about 10%. About 5 pounds of the so-produced dried chips and about 2 pounds of flake sodium hydroxide were introduced into a combination mixing and shredding apparatus in which the bark chips were reduced to the particle size range of about 0.01 to about 0.25 inches in maximum dimension and were simultaneously mixed with the sodium hydroxide. The reaction was then carried out under conditions like those described in Example I to produce a similar product.

Conventional anti-foaming agents may be included in the compositions of the invention if desired. Such agents include octanol, cresol, relatively high molecular weight hydrocarbon oils, silicone anti-foaming agents and the like.

I claim:

1. The process which comprises intimately mixing particulate fibrous whole bark and particulate alkali metal hydroxide in proportions requisite to provide from about 1 to about 10 parts by weight of alkali metal hydroxide for each 10 parts by weight of bark, and heating said dry mixture to a temperature of from about 100° C. to about 150° C. until the bark particles begin to coalesce to form a generally plastic product which is substantially non-fibrous.

2. The process of claim 1 wherein the alkali metal hydroxide is sodium hydroxide.

3. The process of claim 1 wherein the sodium hydroxide is employed in an amount requisite to provide from about 1 to about 5 parts by weight thereof for each 10 parts by weight of bark.

4. The process of claim 1 wherein an organic polyhydroxy compound is added to the reaction mixture during the course of the reaction.

5. The process of claim 1 wherein the bark employed in the process is first heated to reduce the moisture content to below 20% by weight of the bark, and the bark while still hot from said dehydration is mixed with alkali metal hydroxide.

6. The process of claim 1 wherein said mixture is heated to a temperature of about 120° C. to about 140° C.

7. The process which comprises combining substantially dry particulate bark and dry particulate alkali metal hydroxide, and simultaneously and substantially continuously agitating and heating the mixture so obtained to a temperature within the range of about 120° C. to about 140° C., and continuing said heating and agitating until said bark particles begin to coalesce to produce a plastic reaction product which is substantially non-fibrous and water-soluble.

8. The process which comprises mixing fibrous whole bark of relatively large particle size with dry sodium hydroxide and simultaneously agitating said mixture and comminuting said bark to reduce the particle size thereof to within the range of from about 0.01 to about 0.25 inch in maximum dimension, and heating the resulting mixture of alkali metal hydroxide and comminuted bark to a temperature within the range of about 100° C. to about 150° C. until the particles of bark begin to coalesce to produce a plastic reaction product which is substantially non-fibrous and water-soluble.

References Cited in the file of this patent

UNITED STATES PATENTS

| | | |
|---|---|---|
| 1,182,697 | Margolius | May 9, 1916 |
| 1,598,039 | Bentley | Aug. 31, 1926 |
| 2,574,785 | Heritage | Nov. 13, 1951 |